T. P. DORN.
SPRING TIRE.
APPLICATION FILED APR. 16, 1915.
1,192,764.
Patented July 25, 1916.
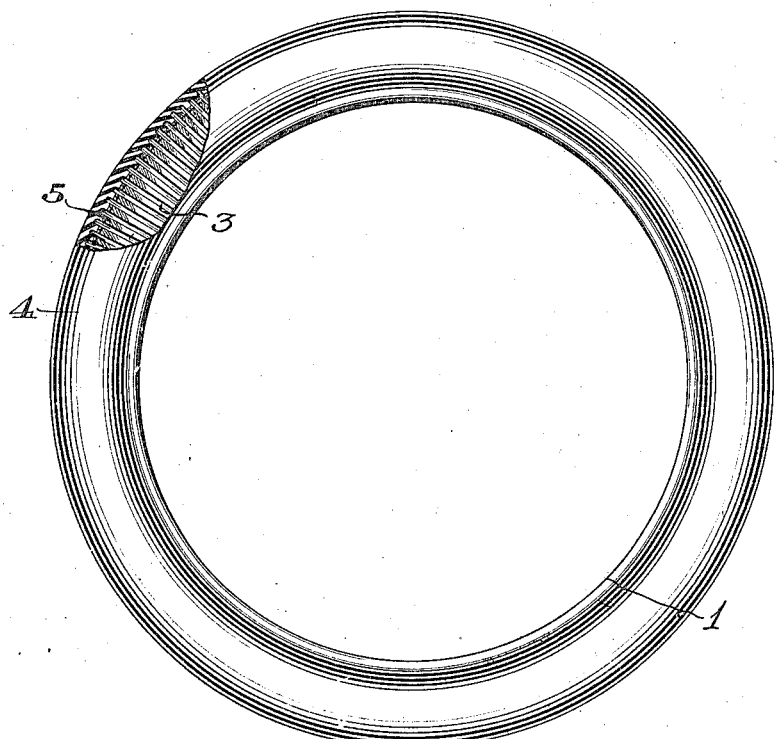
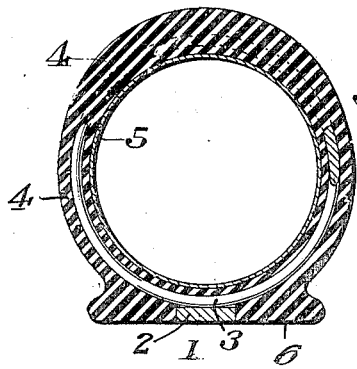
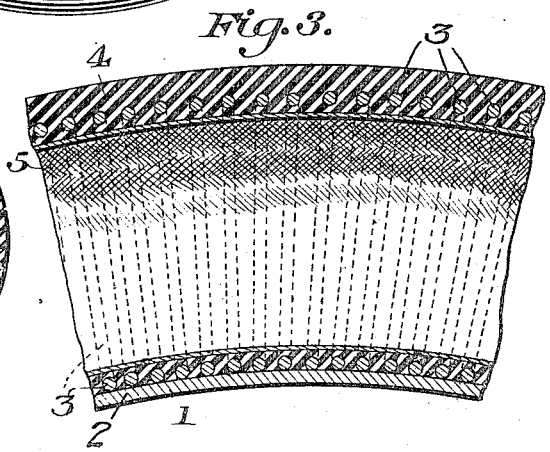
Witnesses
Inventor
Theodore P. Dorn
By Victor J. Evans
Attorney

UNITED STATES PATENT OFFICE.

THEODORE P. DORN, OF CLEVELAND, OHIO.

SPRING-TIRE.

1,192,764.   Specification of Letters Patent.   Patented July 25, 1916.

Application filed April 16, 1915. Serial No. 21,828.

*To all whom it may concern:*

Be it known that I, THEODORE P. DORN, a citizen of the United States, residing at Cleveland, in the county of Cuyahoga and State of Ohio, have invented new and useful Improvements in Spring-Tires, of which the following is a specification.

This invention is an improved spring tire for use on automobiles and other like vehicles and as a substitute for the usual pneumatic tires, the object of the invention being to provide an improved tire of this class which is cheap and simple, is extremely strong and durable, may be readily put on or removed from a wheel and which secures the desired resilient and cushioning effect and enables the use of compressed air or other cushioning fluid to be dispensed with.

The invention consists of certain novel features of construction, combination and arrangement of parts, as will be hereinafter described and claimed.

In the accompanying drawing, Figure 1 is partly an elevation and partly a section of a spring tire constructed in accordance with my invention. Fig. 2 is a transverse sectional view of the same on a larger scale. Fig. 3 is a detail longitudinal sectional view of the same.

The numeral 1 designates the improved tire as an entirety, comprising a metal band 2, a coil spring 3 surrounding said band, and a tubular body 4, in which said spring and band are embedded. The band 2 which is formed from a strip of flat material has an inside diameter equal to the exterior of the rim of the wheel to which the tire is to be applied. The spring 3 which surrounds the band 2 is coiled to provide spaced convolutions which are secured to the outer peripheral surface of the band 2 in any suitable manner, but preferably by welding the band to the convolutions of the spring in such a manner as to hold the convolutions in spaced relation.

The tubular body portion 4 of the tire is molded upon a canvas form 5 between which, and the exterior surface of the body portion 4, is embedded the spring 3. The tubular body portion 4 is provided with a flat rim engaging face 6, in which is embedded the band 2 in such a manner as to enable the inner face of the band 2 to contact with the periphery of a wheel when the tire is placed thereon. The tubular body portion 4 is provided with the usual beads located at opposite sides of and outward of the rim engaging face 6 for engagement with the usual clamping rings by means of which the tire is connected with the wheel of the vehicle.

From the foregoing statement it can be easily seen that the tire can be applied or removed from the wheel of a vehicle when desired, and that the band 2 and spring 3 enable the usual inner tube or other similar cushioning means to be dispensed with. It will also be noted that by embedding the spring 3 and the band 2, in the tubular body 4 in such a manner that the inner face of the band 2 lies flush with the rim engaging face 6 which is inward of the beads on the body 4, any strain imposed upon the tire is equally distributed to all parts of the wheel and tire.

Various changes in the form, proportion and the minor details of construction may be resorted to without departing from the principle or sacrificing any of the advantages of this invention as claimed.

Having thus described the invention, what is claimed as new, is:—

A tire comprising a hollow tubular core bent in circular form, a casing inclosing said core and conforming to the shape thereof, said casing having a flat rim engaging face, a coil spring bent in circular form with the convolutions thereof arranged spirally about the core and embedded in the casing in spaced relation with the core and the outer peripheral surface of the casing, and a flat metal band secured to the coils of said spring and embedded in the casing centrally of the rim engaging face.

In testimony whereof I affix my signature in presence of two witnesses.

THEODORE P. DORN.

Witnesses:
 GEORGE W. SCOTT,
 HENRY DORN.